United States Patent
Fan et al.

(10) Patent No.: US 10,644,557 B2
(45) Date of Patent: May 5, 2020

(54) STATOR USED FOR MOTOR, MOTOR AND VENTILATION COOLING METHOD FOR MOTOR

(71) Applicant: XINJIANG GOLDWIND SCIENCE & TECHNOLOGY CO., LTD., Urumqi, Xinjiang (CN)

(72) Inventors: Wenshou Fan, Xinjiang (CN); Xiang Zhao, Xinjiang (CN)

(73) Assignee: XINJIANG GOLDWIND SCIENCE & TECHNOLOGY CO., LTD., Urumqi, Xinjiang (CN)

( * ) Notice: Subject to any disclaimer, the term of this patent is extended or adjusted under 35 U.S.C. 154(b) by 345 days.

(21) Appl. No.: 15/317,348

(22) PCT Filed: May 8, 2015

(86) PCT No.: PCT/CN2015/078609
§ 371 (c)(1),
(2) Date: Mar. 1, 2017

(87) PCT Pub. No.: WO2015/188672
PCT Pub. Date: Dec. 17, 2015

(65) Prior Publication Data
US 2017/0179781 A1 Jun. 22, 2017

(30) Foreign Application Priority Data
Jun. 13, 2014 (CN) .......................... 2014 1 0266107

(51) Int. Cl.
*H02K 1/20* (2006.01)
*H02K 3/24* (2006.01)
(Continued)

(52) U.S. Cl.
CPC ................. *H02K 3/24* (2013.01); *H02K 1/20* (2013.01); *H02K 3/48* (2013.01); *H02K 9/04* (2013.01); *H02K 3/522* (2013.01)

(58) Field of Classification Search
CPC .. H02K 3/24; H02K 3/48; H02K 9/04; H02K 1/20; H02K 3/522
(Continued)

(56) References Cited

U.S. PATENT DOCUMENTS 3,801,843 A * 4/1974 Corman ............... F28D 15/0275
165/104.25
4,415,822 A * 11/1983 Aiba ........................ H02K 1/20
310/59
(Continued)

FOREIGN PATENT DOCUMENTS

CN  1289167 A  3/2001
CN  1420606 A  5/2003
(Continued)

OTHER PUBLICATIONS

The First Korean Office Action dated Apr. 4, 2018; Appln. No. 10-2017-7000406.
(Continued)

*Primary Examiner* — John K Kim (57) ABSTRACT

A stator used for a motor, the motor and a ventilation cooling method for the motor. The stator includes concentrated windings, and at least two wedge blocks are arranged at the gaps between the adjacent concentrated windings. The at least two wedge blocks are distributed on the concentrated windings in a staggered manner to form a first ventilation path. Therefore, the concentrated windings can be cooled effectively, the concentrated windings are effectively constrained in the circumferential direction by means of the at least two wedge blocks, the service life of the motor is
(Continued)

further prolonged, and the reliability of the motor is improved.

18 Claims, 5 Drawing Sheets

(51) Int. Cl.
*H02K 3/48* (2006.01)
*H02K 9/04* (2006.01)
*H02K 3/52* (2006.01)

(58) Field of Classification Search
USPC .............................................. 310/52, 58, 59
See application file for complete search history.

(56) References Cited

U.S. PATENT DOCUMENTS

| | | | | |
|---|---|---|---|---|
| 5,929,550 A * | 7/1999 | Kaminski | ................ | H02K 3/48 |
| | | | | 310/214 |
| 6,087,745 A * | 7/2000 | Dreher | ................ | H02K 3/22 |
| | | | | 310/270 |
| 6,113,024 A | 9/2000 | Pittard et al. | | |
| 6,204,580 B1 * | 3/2001 | Kazmierczak | ........... | H02K 3/24 |
| | | | | 310/216.119 |
| 6,346,754 B1 * | 2/2002 | Kieda | ................ | H02K 3/24 |
| | | | | 310/270 |
| 7,812,501 B2 * | 10/2010 | Taniyama | ................ | H02K 1/32 |
| | | | | 310/270 |
| 10,038,352 B2 * | 7/2018 | Airoldi | ................ | F03D 15/20 |
| 2002/0074871 A1 * | 6/2002 | Kikuchi | ................ | H02K 3/24 |
| | | | | 310/58 |
| 2002/0185921 A1 | 12/2002 | Mori et al. | | |
| 2003/0057797 A1 | 3/2003 | Kaneko et al. | | |
| 2003/0173861 A1 | 9/2003 | Kawaguchi et al. | | |
| 2007/0024132 A1 | 2/2007 | Salamah et al. | | |
| 2007/0176499 A1 * | 8/2007 | Holmes | ................ | H02K 3/24 |
| | | | | 310/54 |
| 2007/0222333 A1 * | 9/2007 | Hattori | ................ | H02K 3/24 |
| | | | | 310/270 |
| 2007/0236100 A1 | 10/2007 | Parsania et al. | | |
| 2008/0252168 A1 | 10/2008 | Fujita et al. | | |
| 2011/0101801 A1 | 5/2011 | Hattori et al. | | |
| 2012/0161556 A1 * | 6/2012 | Mizutani | ................ | H02K 1/20 |
| | | | | 310/64 |
| 2012/0161557 A1 * | 6/2012 | Mizutani | ................ | H02K 55/04 |
| | | | | 310/64 |
| 2012/0242176 A1 | 9/2012 | Pal | | |
| 2012/0274159 A1 | 11/2012 | Le Besnerais | | |
| 2013/0113311 A1 * | 5/2013 | Downing | ................ | H02K 1/20 |
| | | | | 310/59 |
| 2013/0270936 A1 * | 10/2013 | Mayor | ................ | H02K 9/19 |
| | | | | 310/54 |
| 2013/0285488 A1 * | 10/2013 | Kazmin | ................ | H02K 3/24 |
| | | | | 310/65 |
| 2015/0022050 A1 * | 1/2015 | Sawada | ................ | H02K 3/34 |
| | | | | 310/215 |
| 2017/0179781 A1 * | 6/2017 | Fan | ................ | H02K 1/20 |

FOREIGN PATENT DOCUMENTS

| | | |
|---|---|---|
| CN | 2006-050712 A | 2/2006 |
| CN | 1767320 A | 5/2006 |
| CN | 101051771 A | 10/2007 |
| CN | 101227110 A | 7/2008 |
| CN | 201056595 U | 11/2010 |
| CN | 2011-055625 A | 3/2011 |
| CN | 102332780 A | 1/2012 |
| CN | 102738921 A | 10/2012 |
| CN | 202940695 U | 5/2013 |
| CN | 203607941 U | 5/2014 |
| CN | 203607954 U | 5/2014 |
| CN | 104065186 A | 9/2014 |
| EP | 1215800 A2 | 6/2002 |
| GB | 897503 A | 5/1962 |
| JP | 07264802 A | 10/1995 |
| JP | 11-113222 A | 4/1999 |
| JP | 2003-018772 A | 1/2003 |
| JP | 2007-300718 A | 11/2007 |
| WO | 2014/032876 A2 | 3/2014 |

OTHER PUBLICATIONS

Third Chinese Office Action dated Mar. 27, 2017; Appln. No. 201410266107.0.
The Second Australian Office Action dated May 4, 2018; Appln. No. 2015274121.
International Search Report dated Jun. 30, 2015; PCT/CN2015/078609.
Extended European Seach Report dated Jan. 26, 2018; Appln. No. 15806029.3.
First Chinese Office Action dated Mar. 4, 2016; Appln. No. 201410266107.0.
Second Chinese Office Action dated Oct. 9, 2016; Appln. No. 201410266107.0.

* cited by examiner

| separating the electric machine into a high pressure area and a low pressure area by a support configured to fix the stator |
|---|

↓

| entering cold air into the high pressure area via pipelines to cool the electric machine via a first ventilation path formed by the gap between at least two wedges, and then entering cold air into the low pressure area to change the cold air into hot air |
|---|

STATOR USED FOR MOTOR, MOTOR AND VENTILATION COOLING METHOD FOR MOTOR

This application is the national phase of International Application No. PCT/CN2015/078609, titled "STATOR USED FOR MOTOR, MOTOR AND VENTILATION COOLING METHOD FOR MOTOR", filed on May 8, 2015 which claims the benefit of priority to Chinese patent application No. 201410266107.0, titled "STATOR FOR ELECTRIC MACHINE, ELECTRIC MACHINE AND VENTILATION AND COOLING METHOD THEREOF", filed with the Chinese State Intellectual Property Office on Jun. 13, 2014, the entire disclosures of which applications are incorporated herein by reference.

TECHNICAL FIELD

The present application relates to a stator for an electric machine, an electric machine and a ventilation and cooling method thereof, and particularly to a stator of a permanent magnet machine based on concentrated windings and a ventilation and cooling method thereof.

BACKGROUND

With the increase of capacity of a large-sized permanent magnet machine, internal losses of the permanent magnet machine also increase correspondingly, thus causing a temperature rise of the permanent magnet machine to be over-high, and further adversely affecting safe and stable operation of the permanent magnet machine. Although ventilation and cooling of the electric machine in a radial direction thereof or mixed ventilation and cooling in the radial and axial directions may meet the heat dissipating capability requirements of the large-sized permanent magnet machine, an effective material utilization rate of the large-sized permanent magnet machine is decreased due to the presence of a radial ventilation duct, and the weight and cost of the large-sized permanent magnet machine may be increased.

SUMMARY

A stator for an electric machine, an electric machine and a ventilation and cooling method thereof are provided according to embodiments of the present application to efficiently cool the electric machine.

To realize the above objects, the following technical solutions are adopted in the embodiments of the present application.

A stator for an electric machine includes concentrated windings, and at least two wedges provided in a gap formed between adjacent concentrated windings, and the at least two wedges are staggered on the concentrated winding to form a first ventilation path.

An electric machine includes the stator in the above technical solution.

A ventilation and cooling method for an electric machine, which is implemented via the electric machine according to the above technical solutions, includes:

separating the electric machine into a high pressure area and a low pressure area by a support configured to fix the stator; and entering cold air into the high pressure area via pipelines, cooling the electric machine via the first ventilation path formed by a gap between the at least two wedges, and then entering the cold air into the low pressure area to change the cold air into hot air.

In the stator for the electric machine, the electric machine, and the ventilation and cooling method of the electric machine according to the embodiments of the present application, at least two wedges are arranged in the gap formed between two adjacent concentrated windings, and since the at least two wedges are staggered, a length of the first ventilation path is extended, thus may effectively cool the concentrated windings, and may further facilitate improving a heat dissipating capability of the electric machine, improving a power density of the electric machine, and reducing an effective material consumption of the electric machine, thereby reducing the weight and cost of the electric machine. Furthermore, the wedges may also prevent a circumferential movement of the concentrated winding, thus allows the concentrated winding to be effectively constrained in a circumferential direction of a sloth, and avoids damage to the insulation of the concentrated winding resulted from the back and forth circumferential movement of the concentrated winding in the slot in a long term, thereby prolonging a service life of the electric machine, and improving the reliability of the electric machine.

| Reference Numerals: | |
|---|---|
| 11 concentrated winding, | 12 concentrated winding, |
| 13 concentrated winding, | 20 stator iron core, |
| 21 first tooth portion of the stator iron core, | |
| 22 second tooth portion of the stator iron core, | |
| 23 third tooth portion of the stator iron core, | |
| 201 yoke portion of slot base, | |
| 202 axial ventilation hole of yoke portion of slot base, | |
| 203 axial ventilation hole of the tooth portion; | |
| 3 slot wedge, 41 wedge, 42 wedge, 43 wedge, | |
| 44 wedge, 45 wedge, 46 wedge, 47 wedge, | |
| 48 wedge, 49, 50 insulation 5 rotor, and 6 support. | |
| felt | |

DETAILED DESCRIPTION

A stator for an electric machine, an electric machine, and a ventilation and cooling method thereof according to embodiments of the present application are described in detail hereinafter in conjunction with drawings.

Figure 1:
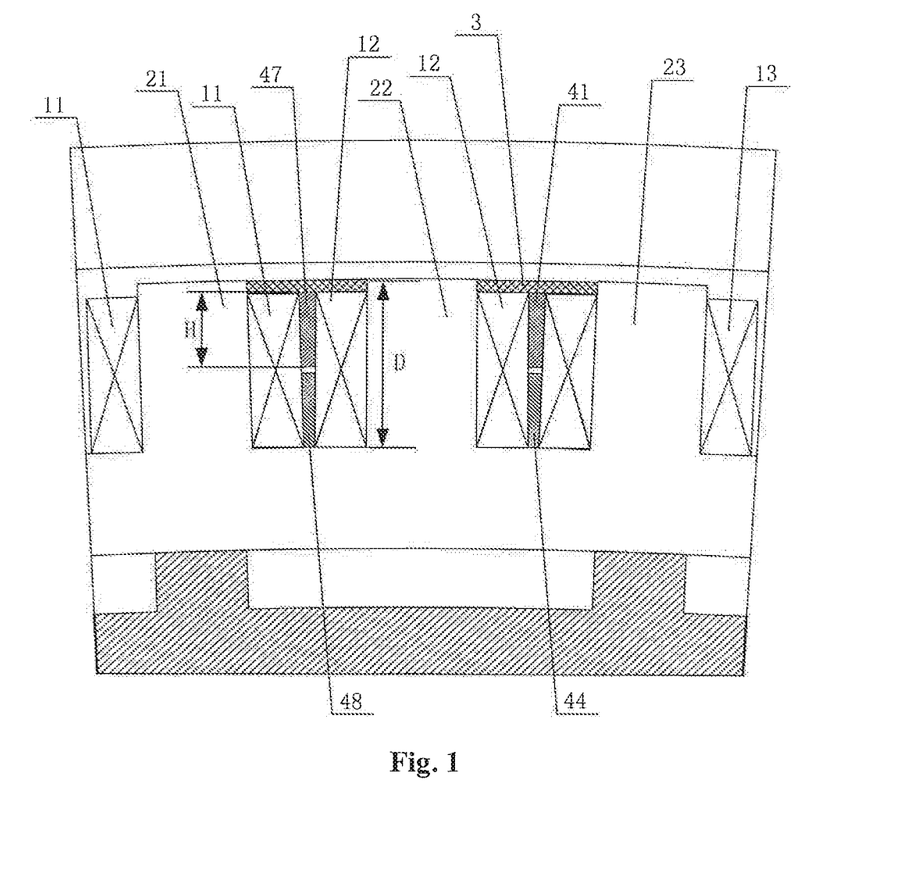
FIG. 1 is a front view of a stator for an electric machine according to an embodiment of the present application.
Figure 2:
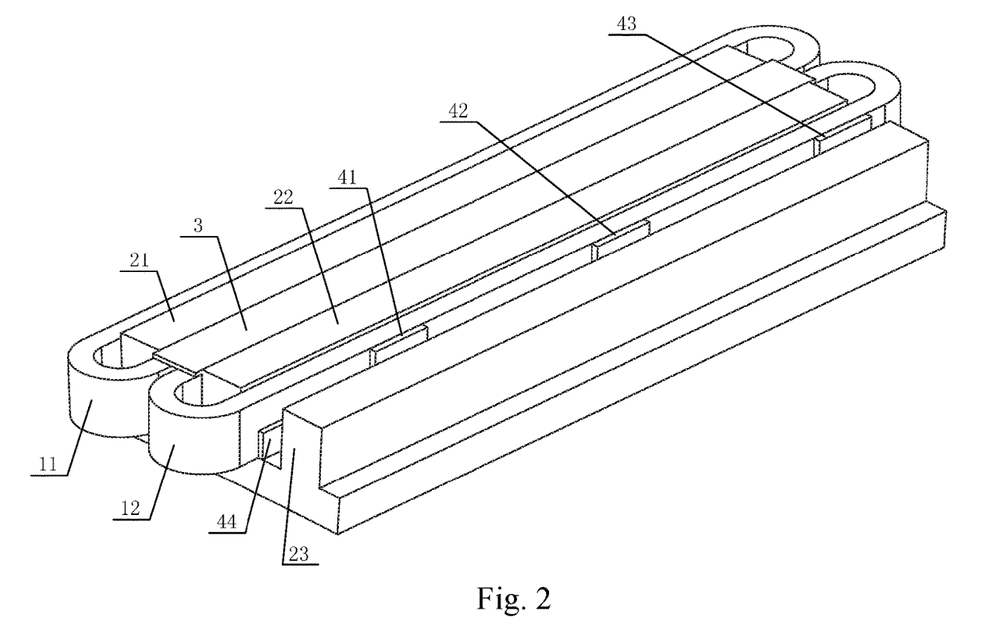
FIG. 2 is a perspective schematic view showing the structure of the stator according to the embodiment in FIG. 1.
Figure 3:
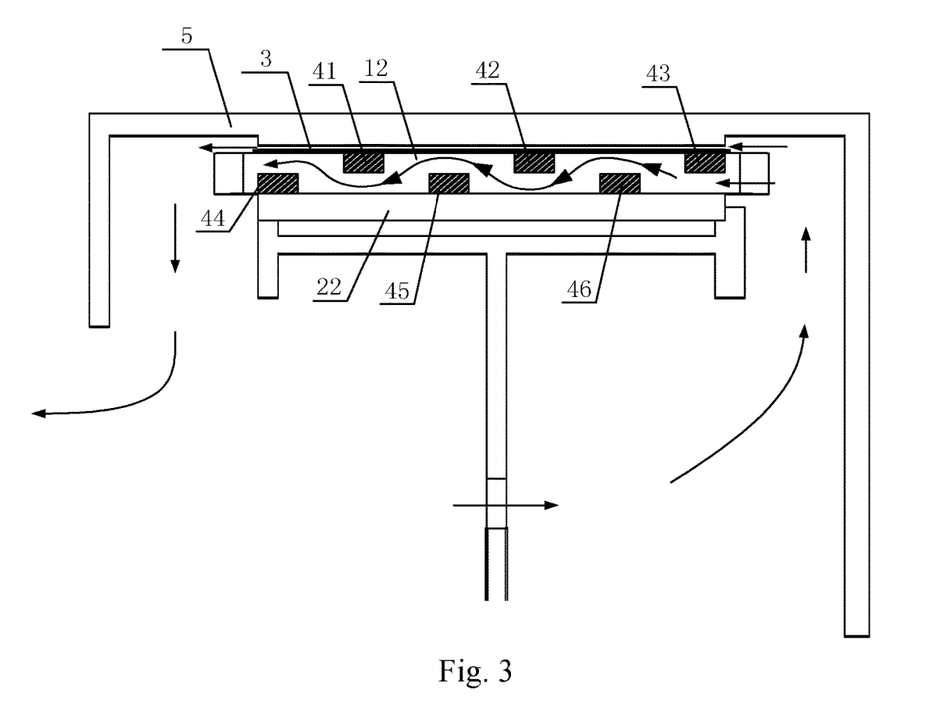
FIG. 3 is a schematic view of a first ventilation path according to the embodiment in FIG. 1.

FIG. 1 is a front view showing a stator for an electric machine according to an embodiment of the present application; FIG. 2 is a perspective schematic view showing the structure of the stator according to the embodiment in FIG. 1; and FIG. 3 is a schematic view showing a first ventilation path according to the embodiment in FIG. 1. As shown in FIGS. 1 and 2, three concentrated windings (a concentrated winding 11, a concentrated winding 12, and a concentrated winding 13), and a stator iron core 20 corresponding to the concentrated winding 11, the concentrated winding 12, and the concentrated winding 13 are exemplified, corresponding to the concentrated windings, the stator iron core 20 has tooth portions (for example, a first tooth portion 21 of the stator iron core, a second tooth portion 22 of the stator iron core, and a third tooth portion 23 of the stator iron core). At least two wedges are provided in a gap formed between the concentrated winding 11 and the concentrated winding 12. As shown in FIG. 3, a wedge 41, a wedge 42, and a wedge 43 are located at upper portions of a side face of the concentrated winding, the wedge 44, the wedge 45 and the wedge 46 are located at lower portions of the concentrated winding, and the wedge 41, the wedge 42, the wedge 43, the wedge 44, the wedge 45, and the wedge 46 are staggered on the side face of the concentrated winding 12, thus forming a first ventilation path. The first ventilation path forms a curved ventilation path due to the staggered distribution of the wedge 41, the wedge 42, the wedge 43, the wedge 44, the wedge 45, and the wedge 46. It should be understood by the person skilled in the art that, the first ventilation path according to the embodiment of the present application may also be of an up-down fluctuated shape, a wave shape, a curvilinear shape, etc., and a specific shape may be determined by positions of the wedges on the concentrated winding. Thus, the shape of the ventilation path is not limited by the embodiment of the present application, as long as a length of the first ventilation path can be extended. It should also be appreciated by the person skilled in the art that, another ventilation path may also be formed by a gap corresponding to other at least two wedges on another side surface of the concentrated winding 12 (for example, the wedge 47, the wedge 48 are located on another other side face of the concentrated winding 12 in FIG. 1), which is not described in detail in the embodiments of the present application hereinafter.

In the stator for the electric machine according to the embodiment of the present application, at least two wedges are arranged in the gap formed between the concentrated winding 11 and the concentrated winding 12 that are adjacent, since the at least two wedges are staggered, the length of the first ventilation path is extended, thus may effectively cool the concentrated winding 11 and the concentrated winding 12, and may further facilitate improving a heat dissipating capability of the electric machine, improving a power density of the electric machine, and reducing an effective material consumption of the electric machine, thereby reducing the weight and cost of the electric machine. Furthermore, the wedges may also prevent the concentrated winding 11 and the concentrated winding 12 from moving in a circumferential direction of slots, thus allowing the concentrated winding 11 and the concentrated winding 12 to be effectively constrained in the circumferential direction, and avoiding damage to the insulation of the concentrated winding 11 and the concentrated winding 12 caused by circumferential back and forth movements of the concentrated winding 11 and the concentrated winding 12 in the slots in a long term, and thereby prolonging a service life of the electric machine, and improving the reliability of the electric machine.

Figure 4:
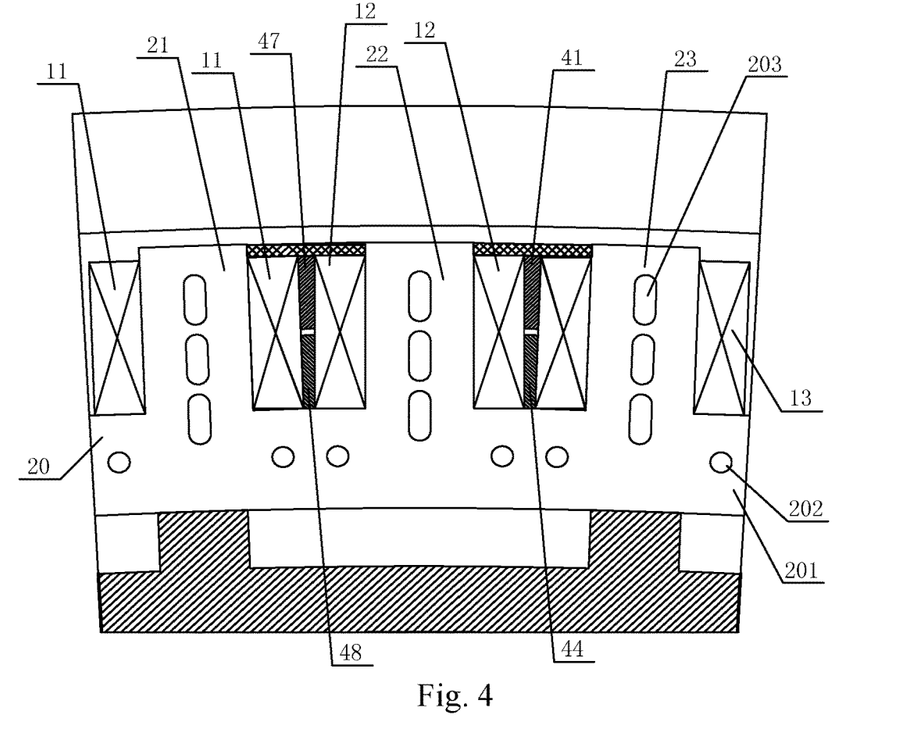
FIG. 4 is a front view of a stator for an electric machine according to another embodiment of the present application.
Figure 5:
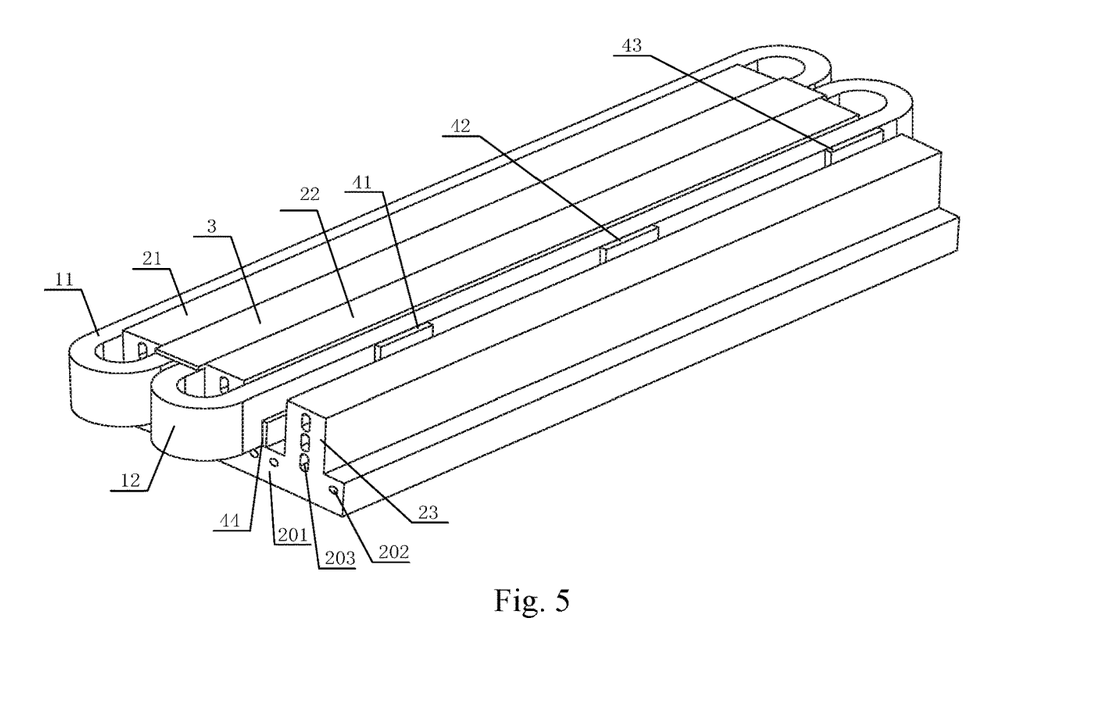
FIG. 5 is a perspective schematic view showing the structure of the stator according to the embodiment in FIG. 4.

FIG. 4 is a front view of a stator for an electric machine according to another embodiment of the present application, and FIG. 5 is a perspective schematic view showing the structure of the stator for the electric machine according to the embodiment shown in FIG. 4. As shown in FIGS. 4 and 5, and based on the embodiment in FIGS. 1 and 2, the first tooth portion 21, the second tooth portion 22 and the third tooth portion 23, and a yoke portion of slot base 201 are respectively provided with an axial ventilation hole 202 and an axial ventilation hole 203, and the axial ventilation hole 203 forms a second ventilation path in the third tooth portion 23 of the stator iron core, and the axial ventilation hole 202 forms a third ventilation path in the yoke portion of slot base 201.

Figure 8:
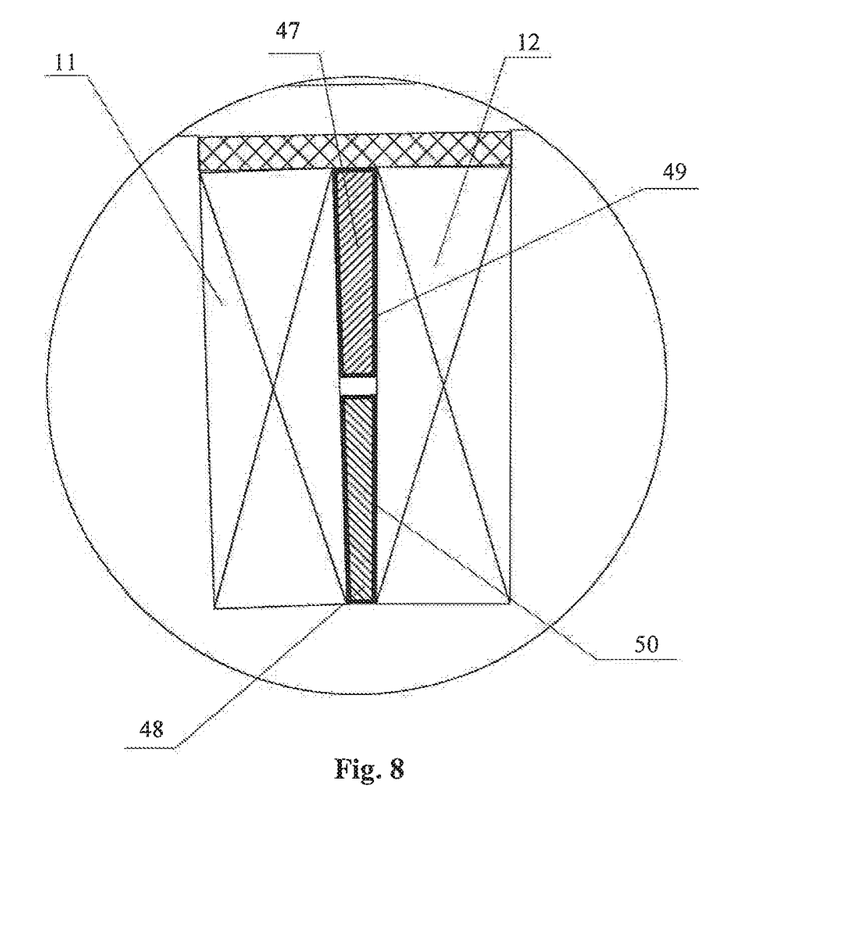
FIG. 8 is a partially enlarged view of FIG. 1.

Further, as illustrated in FIG. 8, each trapezoidal-shaped wedge of the at least two wedges is wrapped with an insulation felt 49, 50, and is fixed in the gap between two adjacent concentrated windings via the insulation felt 49, 50. By wrapping the insulation felt 49, 50 on each of the at least two wedges, the insulation of the concentrated winding 11 and the concentrated winding 12 may be protected, in addition, the wedge may be formed integrally with the concentrated winding after the stator iron core 20 is processed through a vacuum pressure impregnating (Vacuum Pressure Impregnating, which is abbreviated as VPI), and further the wedges may be effectively fixed between the concentrated winding 11 and the concentrated winding 12, and stator iron core 20 may be effectively fixed in the slot. Further, the first tooth portion 21, the second tooth portion 22, and the third tooth portion 23 of the stator iron core 20 are parallel teeth, and each of the slots corresponding to the stator iron core 20 is a trapezoidal-shaped slot. After the concentrated winding 11 and the concentrated winding 12 are fitted in the respective trapezoidal-shaped slots, the gap between two adjacent concentrated windings forms a trapezoidal-shaped gap.

Moreover, the at least two wedges specifically include a first wedge group and a second wedge group, and each of the first wedge group and the second wedge group includes at least one wedge. As shown in FIG. 3, the first wedge group specifically includes the wedge 41, the wedge 42 and the wedge 43 located at the upper portions of the side face of the concentrated winding 12, the second wedge group includes the wedge 44, the wedge 45, and the wedge 46 located at the lower portions of the side face of the concentrated winding 12, and the wedges are staggered along an axial direction of the stator. Further, each of the wedge 41, the wedge 42, the wedge 43, the wedge 44, the wedge 45, and the wedge 46 may be embodied as a trapezoidal-shaped wedge. As described above, the gap between the adjacent two concentrated windings 11, 12 is the trapezoidal-shaped gap, thus the trapezoidal-shaped wedge can be in plane contact with the concentrated winding 11 and the concentrated winding 12, and via the plane contact, forces applied onto the concentrated winding 11 and the concentrated winding 12 may be uniform. Furthermore, for extending the length of the first ventilation path, heights H of the trapezoidal-shaped wedges are required to be slightly greater than or slightly smaller than half of a depth D of the trapezoidal-shaped slot. It should be understood by the person skilled in the field that, an extent of being slightly smaller or slightly greater than half of the depth D of the trapezoidal-shaped slot in this embodiment of the present application refers to an extent on condition that the length of the first ventilation path can be extended. Furthermore, the first ventilation path may specifically be of a curved shape, an up-down fluctuated shape, a wave shape, or a curvilinear shape etc., and the specific shapes are not limited by the embodiments of the present application, as long as the length of the first ventilation path can be extended. Further, a dimension of the height H of the trapezoidal-shaped wedge is not strictly limited in the embodiments of the present application. Moreover, the number of the wedges included in the first wedge group and the second wedge group according to the embodiment of the present application is not limited to the number listed above. It should be understood by the person skilled in the art that, wedges of a corresponding number may be provided according to an axial length of the electric machine and the practical ventilation requirements, for example, the first wedge group and the second wedge group may both include only one wedge.

Alternatively, only the first wedge group (for example, the wedge 41, the wedge 42, the wedge 43, these are referred to as upper wedges) are provided on the entire upper portion at the gap between windings of the concentrated winding 12, or only the second wedge group (for example, the wedge 44, the wedge 45, the wedge 46, these are referred to as lower wedges) are provided on the entire lower portion at the gap between the windings of the concentrated winding 12, thus a ventilation path is formed by the entire upper portion or the entire lower portion at the gap between the windings. Alternatively, one upper wedge and one lower wedge are fitted in each of the gaps at two end portions of the concentrated winding only, or only one upper wedge or one lower wedge is fitted in each of the gaps at two ends of the concentrated winding respectively, and the first ventilation path can be formed as long as there is a certain gap between the wedges. It should be understood by the person skilled in the art that, the specific distribution of the wedges is not limited by the embodiments according to the present application. Alternatively, at least two wedges are fitted at a center portion of the gap between the windings of the concentrated winding 12, thus two up-down ventilation paths are formed at the gap, and by increasing a number of the ventilation paths, the concentrated winding can be fully cooled.

Furthermore, referring to FIG. 3 again, a slot wedge 3 is further provided in the gap formed between the concentrated winding 11 and the concentrated winding 12. Based on the first ventilation path in FIG. 3, an air gap is formed between a rotor 5 and the slot wedge 3, and a fourth ventilation path is formed by the air gap.

Figure 6:
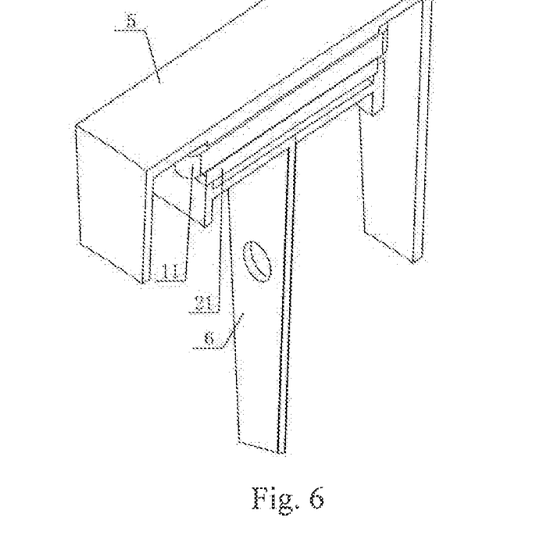
FIG. 6 is a perspective view showing the structure of a stator for an electric machine according to yet another embodiment of the present application.

FIG. 6 is a perspective schematic view showing the structure of a stator for an electric machine according to yet another embodiment of the present application. As shown in FIG. 6, based on the embodiments shown in FIGS. 1 to 5, the stator further includes a support 6 for supporting the stator iron core 20, and the support 6 separates an inner cavity of the electric machine into a high pressure area and a low pressure area. Specifically, as shown in FIG. 6, a right side of the rotor 5 is a wheel hub side, and a left side is an electric machine room side, the stator support 6 separates the inner cavity of the electric machine into the high pressure area (the wheel hub side) and the low pressure area (the electric machine room side), thus the first ventilation path, the second ventilation path, the third ventilation path, and the fourth ventilation path are from the wheel hub side to the electric machine room side. Alternatively, if the electric machine room side is a high pressure area, and the wheel hub side is a low pressure area, the ventilation paths in the inner cavity of the electric machine may have a direction opposite to a flowing direction indicated in FIG. 3.

An electric machine is further provided according to an embodiment of the present application, and the electric machine includes the stator for the electric machine in the embodiments in FIGS. 1 to 6. Further, the electric machine may include a wind driven generator.

Figure 7:
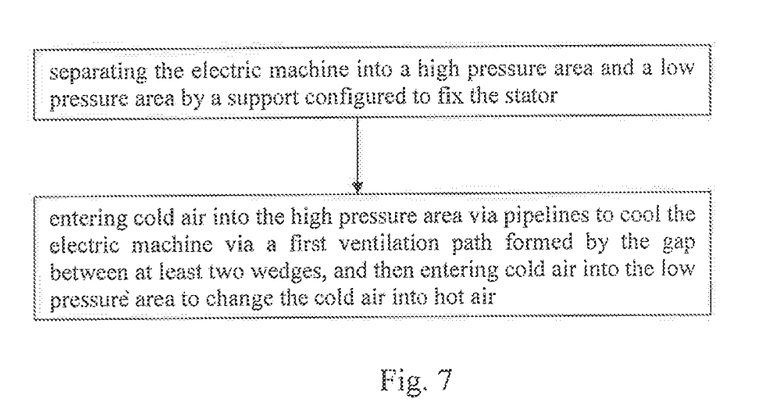
FIG. 7 is a schematic flow diagram showing a ventilation and cooling method for an electric machine according to an embodiment of the present application.

FIG. 7 is a schematic flow chart showing a ventilation and cooling method for an electric machine according to an embodiment of the present application. The ventilation and cooling method according to this embodiment of the present application can be implemented via the electric machine according to the above embodiments. As shown in FIG. 7, the ventilation and cooling method for the electric machine according to the embodiment of the present application includes steps 701 to 702.

In step 701, the electric machine is separated into the high pressure area and the low pressure area by the support configured to fix the stator.

In step 702, cold air enters into the high pressure area via pipelines, cools the electric machine via the first ventilation path formed by the gap between the at least two wedges, and then enters into the low pressure area to change into hot air.

In the ventilation and cooling method according to this embodiment of the present application, the first ventilation path is formed by at least two wedges in the gap formed by adjacent two concentrated windings, a length of the first ventilation path is extended, thus may effectively cool the concentrated windings, and may further facilitate improving the heat dissipating capability of the electric machine, and improving the power density of the electric machine, and reducing the effective material consumption of the electric machine, thereby decreasing the weight and cost of the electric machine.

Further, based on the embodiment in the FIG. 7, the cold air may also cool the electric machine via the second ventilation path formed in the tooth portion and the third ventilation path formed in the yoke portion of slot base, and then enters into the low pressure area to turn into hot air.

Further, based on the embodiment in the FIG. 7, the cold air may also cool the electric machine via the fourth ventilation path formed by the air gap between the rotor and the stator iron core, and then enters into the low pressure area to change into hot air.

Further, based on the embodiment in the FIG. 7, the ventilation and cooling method may further include:

entering the hot air into a cooling system in the electric machine room of the electric machine via pipelines to cool the hot air, and then returning the cooled air to an interior of the electric machine, thus forming an inner circulation air path.

Further, based on the embodiment in FIG. 7, the ventilation and cooling method may further include:

entering cold air outside the electric machine room of the
electric machine into the cooling system in the electric
machine room of the electric machine via pipelines,
cooling the hot air in the inner circulation air path via
the cooling system in the electric machine room, and
then the hot air is discharged out of the electric machine
room.

In conclusion, by providing ventilation paths around or in the center of the concentrated windings in each slot, the embodiments of the present application address the technical issues that the axial ventilation and cooling technology cannot meet the heat dissipating capability requirement of the electric machine in the conventional technology. Besides, the cold air enters into the high pressure area in the interior of the electric machine via pipelines, and the cold air cools the electric machine via the ventilation and cooling path in the slot between the rotor and the stator iron core (first ventilation path), the ventilation and cooling path in the tooth portion (second ventilation path), the ventilation and cooling path in the yoke portion of slot base (third ventilation path), and the ventilation and cooling path in the air gap (fourth ventilation path), and then enters into the low pressure area to be turned into hot air, and then the hot air enters into the cooling system inside the electric machine room to be cooled and returns to the interior of the electric machine, thus forming a complete inner circulation air path, and effectively cooling the a heating source of the electric machine (concentrated windings). Compared with a water cooling system, and an open radial forced ventilation and cooling, the reliability of the electric machine according to the embodiments of the present application may be higher, thus may further meet the heat dissipating capability requirements of a large-sized permanent magnet machine.

The embodiments described hereinabove are only specific embodiments of the present application, and should not be interpreted as limitation to the protection scope of the present application. It is obvious for those skilled in the art to make variations or replacements within the technical scope of the present application, and these variations or replacements are also deemed to fall into the scope of the present application. Therefore, the scope of the present application is defined by the claims.

The invention claimed is:

1. A stator for an electric machine, comprising concentrated windings, each of the concentrated windings winds around a tooth portion of an iron core of the stator, and at least two wedges are provided in a gap formed between adjacent ones of the concentrated windings, wherein the at least two wedges are staggered on the concentrated winding in both an axial direction and a radial direction of the stator to form an axial first ventilation path,
wherein each of the at least two wedges is wrapped with an insulation felt, and the insulation felt is processed by vacuum pressure impregnating, to allow the at least two wedges and the concentrated windings to form integrally.

2. The stator according to claim 1, wherein tooth portions of the iron core of the stator are parallel, and each of slots corresponding to the iron core of the stator is a trapezoidal-shaped slot.

3. The stator according to claim 2, wherein the at least two wedges comprises a first wedge group and a second wedge group, and the first wedge group and the second wedge group are staggered in both the axial direction and the radial direction of the stator.

4. The stator according to claim 3, wherein each of the wedges in the first wedge group and the second wedge group is trapezoidal-shaped, and the trapezoidal-shaped wedges are in plane contact with the concentrated windings.

5. The stator according to claim 4, wherein a height of the trapezoidal-shaped wedge is slightly larger or smaller than half of a depth of the trapezoidal-shaped slot.

6. The stator according to claim 1, wherein the stator further comprises a support for supporting the stator, and the support separates an inner cavity of the electric machine into a first pressure area and a second pressure area, wherein pressure of the first pressure area is higher than that of the second pressure area.

7. The stator according to claim 1, wherein a slot wedge is further provided to bridge the gap, an air gap is formed between the slot wedge and the rotor, and a fourth ventilation path is formed by the air gap.

8. An electric machine, wherein the electric machine comprises the stator according to claim 1.

9. The electric machine according to claim 8, wherein the electric machine comprises a wind driven generator.

10. A stator, for an electric machine, comprising concentrated windings, and, at least two wedges are provided in a gap formed between adjacent ones of the concentrated windings, wherein the at least two wedges are staggered on the concentrated winding to form a first ventilation path, wherein at least one of a tooth portion and a yoke portion of a slot base of an iron core of the stator are each provided with an axial ventilation hole, the axial ventilation hole in the at least one of the tooth portion forms a second ventilation path at the tooth portion, and the axial ventilation hole in the yoke portion of the slot base forms a third ventilation path at the yoke portion of the slot base.

11. An electric machine, wherein the electric machine comprises the stator according to claim 10.

12. A ventilation and cooling method for an electric machine, implemented by the electric machine, in which the electric machine comprises the stator, and the stator comprises concentrated windings, and at least two wedges are provided in a gap, formed between adjacent ones of the concentrated windings, wherein the at least two wedges are staggered on the concentrated winding to form a first ventilation path, wherein the ventilation and cooling method comprises:
separating the electric machine into a first pressure area and a second pressure area by a support configured to fix the stator, wherein pressure of the first pressure area is higher than that of the second pressure area; and
entering air into the first pressure area to cool the electric machine via the axial first ventilation path formed by the gap between the at least two wedges, and then entering the air into the second pressure area to allow a temperature of the air to be increased.

13. The ventilation and cooling method for the electric machine according to claim 12, wherein the ventilation and cooling method further comprises:
cooling the electric machine via a second ventilation path formed in the tooth portion of the stator and a third ventilation path formed in a yoke portion of a slot base of the stator, and then entering air into the second pressure area to allow the temperature of the air to be increased.

14. The ventilation and cooling method for the electric machine according to claim 12, wherein the air cools the electric machine via a fourth ventilation path formed by an air gap between the rotor and the iron core of the stator, and then enters into the second pressure area to increase the temperature of the air.

15. The ventilation and cooling method for the electric machine according to claim 12, wherein the ventilation and cooling method further comprises:
entering the air with an increased temperature into a cooling system in an electric machine room of the electric machine to cool the air, and returning cooled air to an interior of the electric machine, thus forming an inner circulation air path.

16. The ventilation and cooling method for the electric machine according to claim 15, wherein the ventilation and cooling method further comprises:

entering cold air outside the electric machine room of the electric machine into the cooling system in the electric machine room, cooling the hot air in the inner circulation air path via the cooling system in the electric machine room, and discharging the hot air out of the electric machine room.

17. The ventilation and cooling method for the electric machine according to claim 13, wherein the ventilation and cooling method further comprises:

entering the hot air into a cooling system in an electric machine room of the electric machine to cool the hot air, and returning cooled air to an interior of the electric machine, thus forming an inner circulation air path.

18. The ventilation and cooling method for the electric machine according to claim 14, wherein the ventilation and cooling method further entering the hot air into a cooling system in an electric machine room of the electric machine to cool the hot air, and returning cooled air to an interior of the electric machine, thus forming an inner circulation air path.

\* \* \* \* \*